United States Patent [19]
Faisant

[11] Patent Number: 6,082,517
[45] Date of Patent: Jul. 4, 2000

[54] SPEED LIMITER FOR BOXES OR PALLETS

[75] Inventor: Gilles Faisant, Les Sables d'Olonne, France

[73] Assignee: Sipa Roller, Le Captif, France

[21] Appl. No.: 08/849,077

[22] PCT Filed: Dec. 1, 1995

[86] PCT No.: PCT/FR95/01588

§ 371 Date: Aug. 1, 1997

§ 102(e) Date: Aug. 1, 1997

[87] PCT Pub. No.: WO96/16883

PCT Pub. Date: Jun. 6, 1996

[30] Foreign Application Priority Data

Dec. 2, 1994 [FR] France ................................ 94.14681

[51] Int. Cl.[7] .................................................. B65G 13/00
[52] U.S. Cl. ........................................................ 193/35 B
[58] Field of Search ......................... 193/35 B; 198/782, 198/722, 781.04

[56] References Cited

U.S. PATENT DOCUMENTS

| | | | |
|---|---|---|---|
| 1,728,538 | 9/1929 | Gentil et al. | 198/782 |
| 1,761,199 | 6/1930 | Drake | 198/782 |
| 2,236,029 | 3/1941 | Eggleston | 198/358 |
| 3,737,022 | 6/1973 | DeNeefe et al. | 198/782 |
| 3,958,684 | 5/1976 | Garzelloni | 198/782 |
| 5,020,657 | 6/1991 | Huber | 198/782 |
| 5,086,903 | 2/1992 | Agnoff | 198/35 B |
| 5,526,923 | 6/1996 | Johansson et al. | 198/722 |

*Primary Examiner*—Christopher P. Ellis
*Assistant Examiner*—Joe Dillon, Jr.
*Attorney, Agent, or Firm*—Greenblum & Bernstein P.L.C.

[57] ABSTRACT

Speed limiter for boxes or pallets for use in an a conveyor system having a tilted plane that includes at least one roller. The limiter includes a rotatable drum adapted to be pressed against a load, the load driving the rotatable drum, a speed-sensitive braking mechanism adapted to hinder the rotational movement of the rotatable drum, a shaft mounted coaxial to the drum, the drum and the braking mechanism being mounted about the shaft, and at least one bracket adapted to fixedly mount the shaft to a structure of the conveyor system. The bracket is adapted to elastically press the drum to the load, and has a predetermined degree of rotational movement such that the bracket may pivot about an axis transverse to the movement of the load. The bracket has an elastic device providing a first level of force and a first resistance to deformation of the bracket, and the elastic device also provides a second level of force and a second resistance to deformation of the bracket during braking of the drum, the second level of force increasing the contact force between the drum and the load. The second resistance is greater than the first resistance, and the bracket applies the second level of force up to a predetermined threshold.

12 Claims, 4 Drawing Sheets

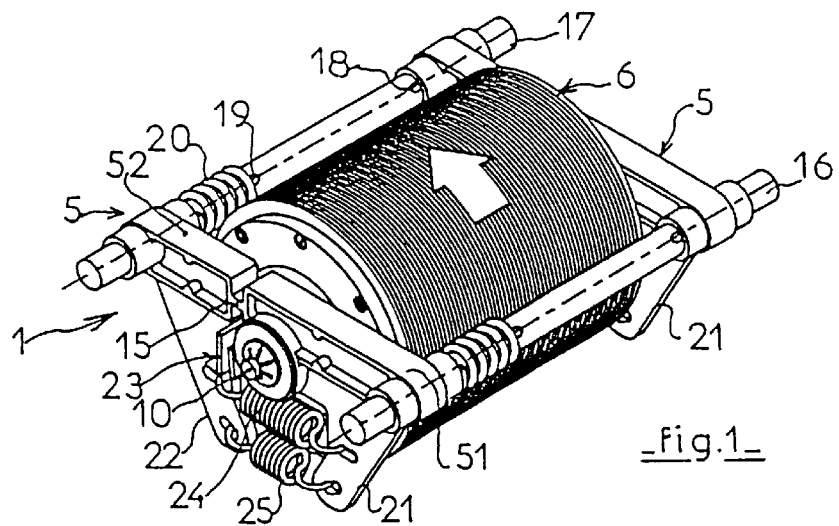
_fig.1_
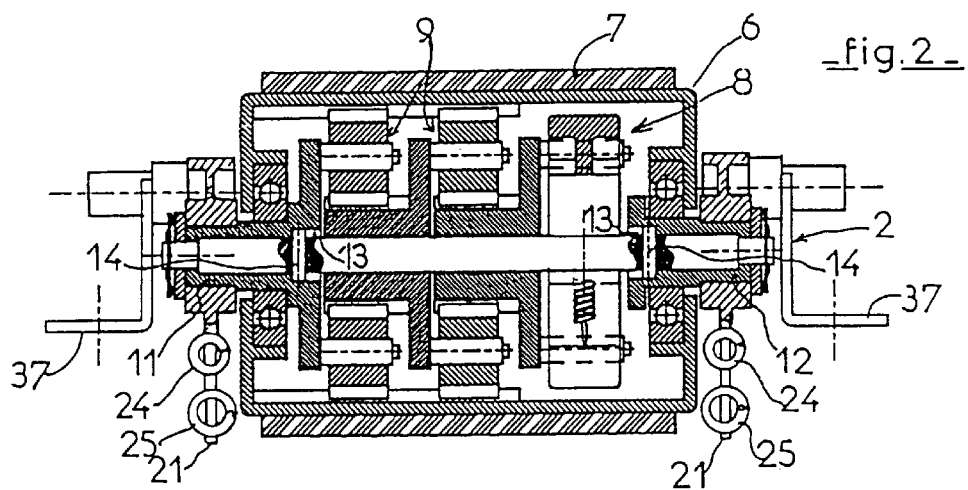
_fig.2_
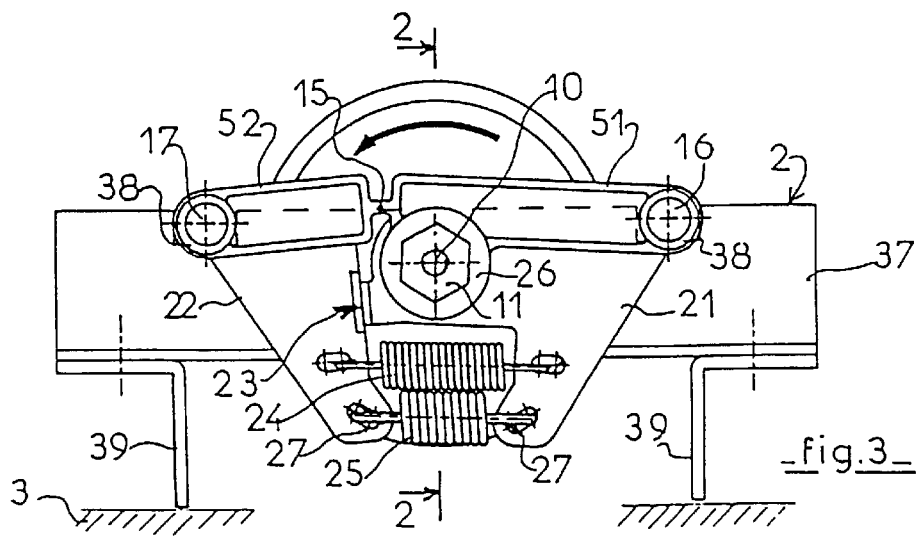
_fig.3_

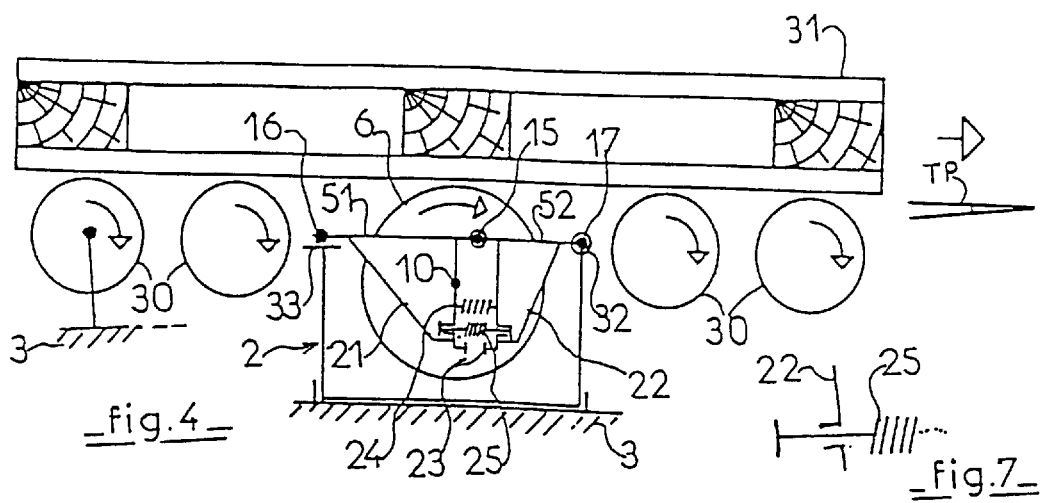
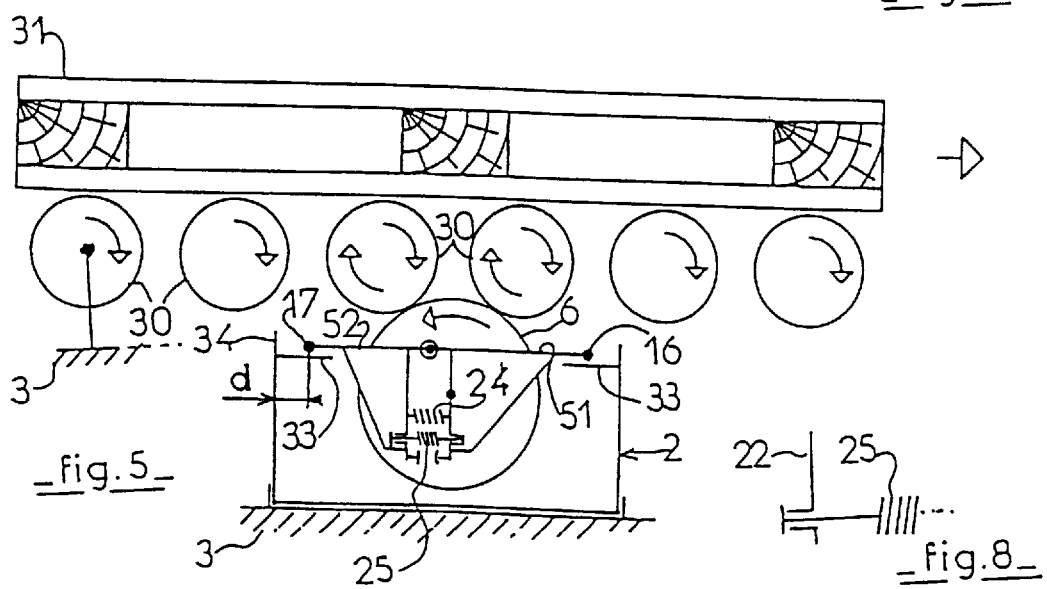
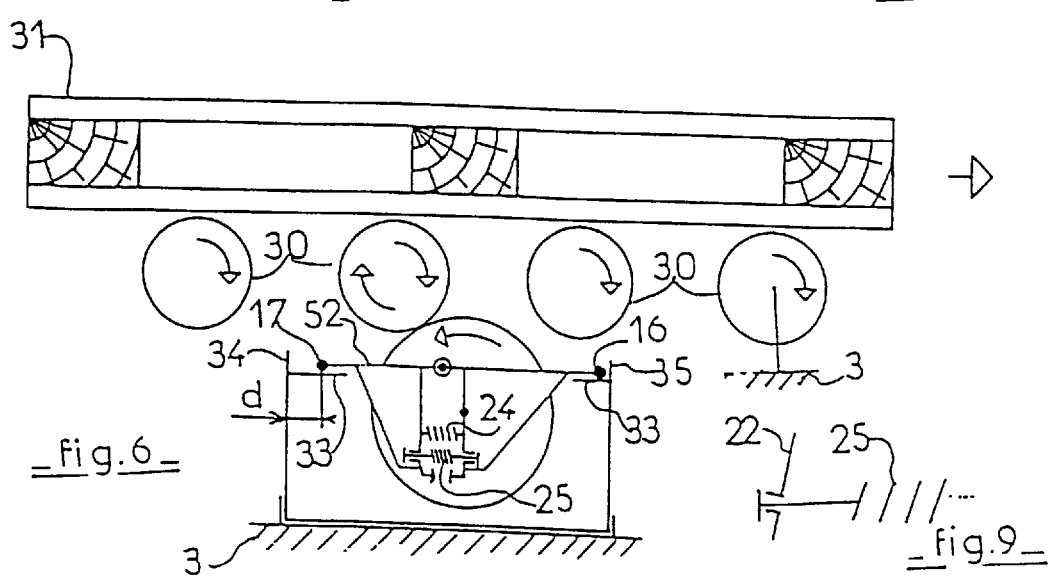

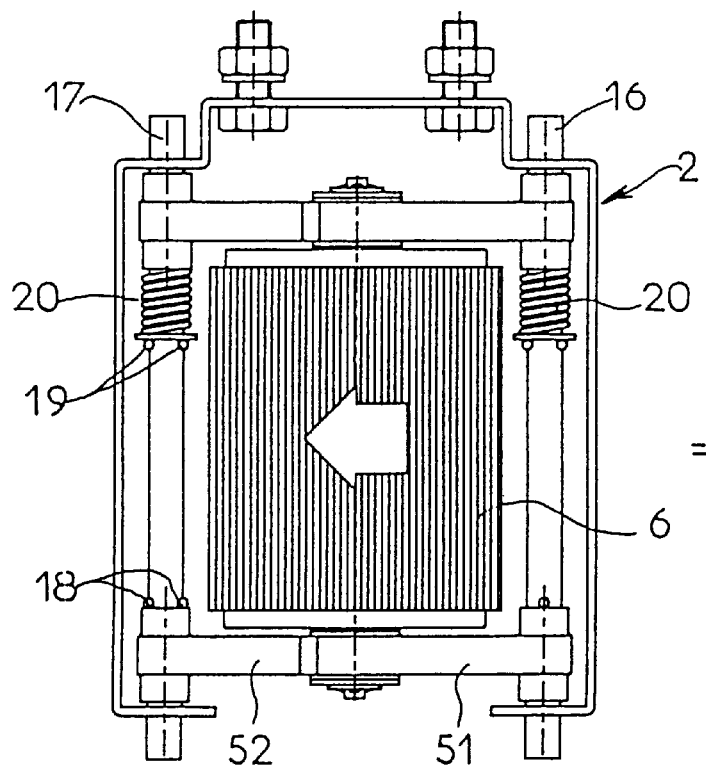
_fig.10_
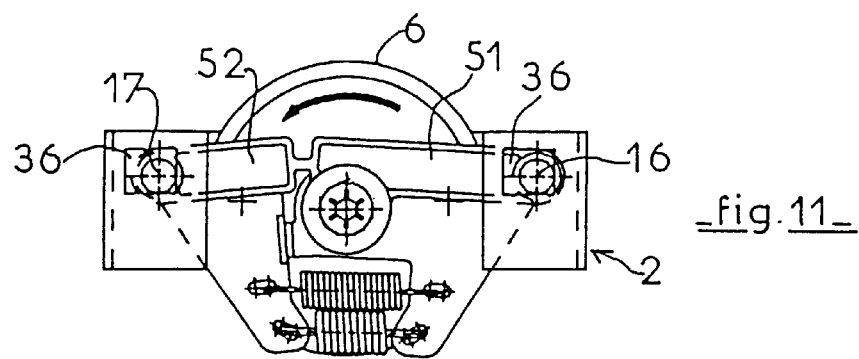
_fig.11_
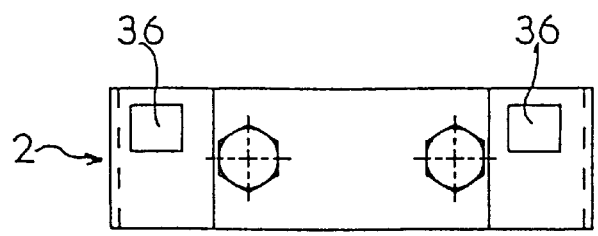
_fig.12_

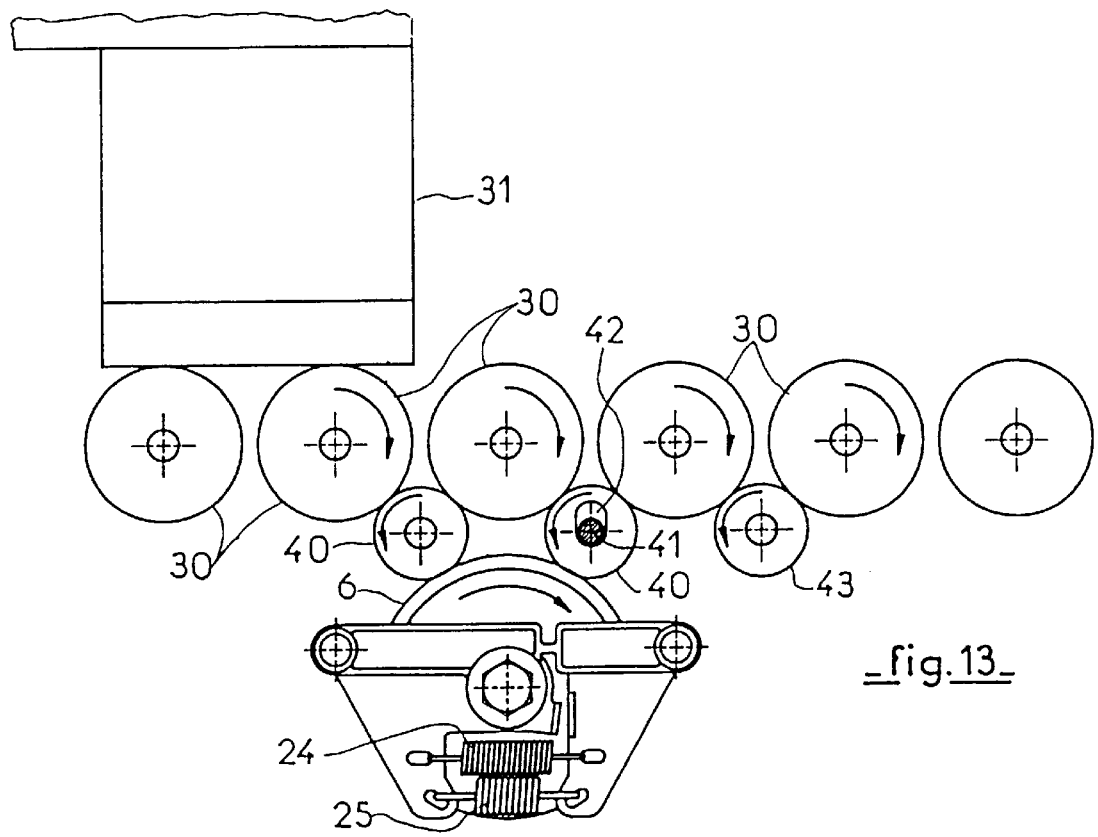
_fig. 13_
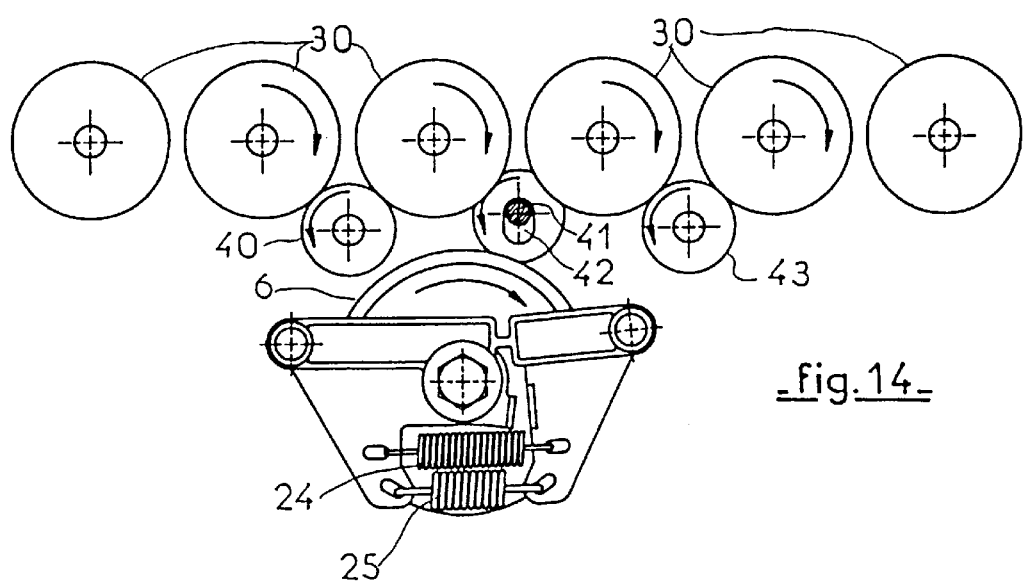
_fig. 14_

SPEED LIMITER FOR BOXES OR PALLETS

BACKGROUND OF THE INVENTION

1. Field of the Invention

This invention relates to a device designed for limiting the speed of boxes or pallets with various load, capable of gravity displacement over a tilted plane having cylinders or rollers.

2. Background and Material Information

Speed limiting devices are generally used in conveying or dynamic storage facilities. In order to control the speed of these boxes or pallets, over a conveyor made up of cylinders or rollers, inertia-type braking devices are known. Such a braking device is described in German patent document DE-U-69 29 711. Such a braking device has a drum fitted with an adhesive coating, which is directly in contact with the box or pallet or indirectly via one or two cylinders, interposed between the box or pallet and the drum.

This known drum is mounted on a shaft, which is parallel to the axis of the conveyor's cylinders and is connected by a bracket to the conveyor's structure. In home position (i.e., in the absence of boxes or pallets) the drum is maintained slightly cantilevered with respect to the conveying plane, using an elastic element. It retracts automatically during the passage of a box or pallet and the elastic element generates a contact pressure between the drum and the box or pallet which causes, under the adherence effect, the rotation of the drum.

When the invention is indirectly mounted, pressure is generated on the movement transmission cylinders, whereas the cylinders, which are mounted with a certain clearance on the structure, are also, in the absence of boxes or pallets, slightly cantilevered with respect to the circulation plane of the boxes or pallets.

The rotation of the drum drives, at a predetermined speed, a braking system via feeders which are brought into rotation by one of several epicycloidal gear trains operably accommodated inside the drum.

At a predetermined linear speed, which ranges from approximately 0.25 to 0.30 m/s, the feeders come into contact with the internal wall of the drum and the whole assembly tends to come to a halt, the assembly retained by the central shaft and, in particular, the first satellite carrier.

The braking device has an absolute braking unit which operates at a predetermined speed ranges from approximately 0.25 to 0.30 m/s. This speed corresponds to the total locking and immobilization speed of the drum. When a load (e.g., a box or a pallet) moves over the tilted plane, it is braked automatically. The efficiency of this braking system depends on the adherence forces between the drum and its driving vector, i.e., the load in case of direct driving or the cylinder(s) in case of indirect driving.

SUMMARY OF THE INVENTION

This present invention provides a speed limiter capable of modifying the pressure between the drum and its driving vector, in relation to the rotation speed of the drum, while limiting this pressure to a pre-set maximum value in order to avoid any risk of deteriorating the drum and/or the braking mechanism, whereby the pressure modification is produced by elastic means implemented by the movement of the bracket during heavy braking.

The pressure between the drum and its driving vector exhibits several levels. There is a first level of pressure and adherence, resulting from the simple presence of the driving vector, even if it is static. The adherence resulting from this pressure, between the drum and its vector, enables, when the vector is in motion, to bring the drum into rotation. The resistance of the drum to this driving force increases at the same time as its rotation speed, which implies that as soon as this resistance becomes stronger than the driving force, a sliding phenomenon takes place.

While providing a system for varying the pressure between the drum and its driving vector, the invention creates several levels of pressure and adherence, thereby providing the speed limiter with a multi-purpose character (i.e., it becomes capable of braking all types of loads) loads whose weights are quite different and whose displacement speeds over the conveyor or the aisle are also quite different; whereas the aim of the speed limiter is to maintain the speed below a pre-set threshold without, however, interfering with the displacement of the loads.

The speed limiter according to an embodiment of the invention is connected rigidly to the structure via a bracket which comprises lateral beams made up of arms, whereas the beams are of the same type as those described in the German patent document DE-A-39 04 284.

The arms making up the supporting beam are articulated with respect to one another and are fitted with gussets which carry a stop to limit the amplitude of the movement of the arms in relation to one another in one direction; and a spring-shaped elastic element which impairs the movement of the arms.

According to the invention, the arms of the beams are supported with a certain degree of liberty in a cradle which is connected rigidly to the structure of the conveyor and which organizes their movements, whereas the movements are impaired by two elastic elements: 1) a first elastic element which exhibits the characteristic of being particularly flexible to enable the retraction of the drum during the passage of a load and to fulfill the contact maintaining function between the braking drum and its driving vector with sufficient pressure to drive the drum thanks to a first level of adherence; and 2) a second elastic element, whose yield strength is greater, which provides a second level of adherence, higher than the first level of adherence, whereas the said elastic element is actuated when, under the effect of increasing the speed of the driving vector, both arms pivot round their articulation, thus causing the extension of the said elastic elements, via the gussets of the arms.

According to the invention, the second elastic element has the form of a helicoid spring mounted at its ends onto the gussets of the arms of a single beam, with sufficient clearance thanks to oblong holes or equivalent, in order to remain inactive when the drum switches from the inactive position to the position in which it retracted by the load on the one hand and maintained in contact with the said load on the other, by the first elastic element which also exhibits the shape of a helicoid spring.

Still according to the invention, the arms making up the supporting brackets comprise, at their ends, transverse rods parallel to the axis of the drum's shaft, whereas the said rods are positioned on the cradle fixed to the structure, whereby the said cradle contains windows whose sizes are greater than the diameter of the said rods in order to grant at least to one of them, a liberty of movement enabling it to move in a controlled fashion, at least in one plane more or less parallel to the displacement plane of the load.

Still according to the invention, the shaft of the braking drum and of the mechanism, comprises means enabling to connect both its lateral carrying arms, in order to cause a symmetrical reaction of the said arms when the speed of the driving vector causes a rotation movement of the said arms and the actuation of the second elastic element.

Still according to the invention, the rods of the arms are, preferably, of the retractable type in an elastic way, in order to facilitate the assembly and disassembly of the speed limiter in its cradle.

The invention also relates to a dynamic storage facility having at least one speed limiter of the present invention. The speed limiter may also be present between 1) the cylinders forming the tilted plane of the installation and the drum of the speed limiter, the 2) intermediate rollers or cylinders in contact with a certain cylinder of the tilted plane and 3) the cylinders adjoining the tilted plane, when the drum is in normal braking mode.

Still according to the invention, the installation may also comprise, downstream of the speed limiter, an additional roller or cylinder serving as a coupling element between the cylinders downstream of the said speed limiter.

BRIEF DESCRIPTION OF THE DRAWINGS

The invention will be detailed further using the following description and the appended drawings, given for exemplification and in which:

FIG. 1 represents in perspective a speed limiting device according to the invention;

FIG. 2 is a diagrammatical representation of the cross section of the speed limiting device represented on FIG. 1, carried by a cradle;

FIG. 3 is a side view of the speed limiting device according to the invention, carried by a cradle, represented without the locking means of the drum's shaft on the supporting arms;

FIG. 4 is a diagrammatical representation of a speed limiting device integrated to a tilted plane whose drum has been arranged to be directly in contact with a pallet;

FIG. 5 represents a speed limiting device integrated to a tilted plane, indirectly mounted, i.e., the drum is driven by two cylinders which are in contact with a pallet;

FIG. 6 represents a variation of FIG. 5 in which the speed limiting device is in contact with a single cylinder;

FIG. 7 is a diagrammatical representation of one end of the second elastic element when, in the example of FIG. 3, the speed limiter is in home position, i.e., when it is not subject to the action of a load;

FIG. 8 is another diagrammatical representation of the end of the second elastic element when, as represented on FIGS. 4 to 6, the limiting device is in active position, whereby the drum is driven into rotation at a speed smaller than its locking speed;

FIG. 9 represents the end of the second elastic element, when the latter is active;

FIG. 10 represents a speed limiting device seen from above, positioned in a cradle, according to another embodiment;

FIG. 11 represents a side view of the device represented on FIG. 10;

FIG. 12 represents the cradle of FIG. 11, on its own, seen sideways;

FIG. 13 represents a portion of a dynamic storage facility and especially a portion of a conveyor showing an example of indirect assembly of the speed limiter; and FIG. 14 represents the speed limiter in a facility corresponding to FIG. 13, in an intense braking configuration implementing the second level of adherence.

DETAILED DESCRIPTION OF THE PREFERRED EMBODIMENTS

The speed limiter, shown in FIGS. 1 to 3, has constituted a bracket 1 carried by a cradle 2 that is mounted to a structure 3 of a conveyor or an aisle of a dynamic storage system.

This bracket 1 includes a pair of lateral beams 5 that support a braking drum therebetween 6.

This braking drum 6 has a shroud 7 made up of an adhesive material and contains a braking mechanism 8. The braking mechanism 8 is located inside the drum and includes feeders and a double epicycloidal gear train 9 rotatably driving these feeds.

This drum 6 and its braking mechanism 8 are mounted on a central shaft 10 which is supported by the lateral beams 5, and more particularly, by arms making up the lateral beams. This shaft 10 is positioned at the midpoint of each beam 5. A middle plane defined by the beam 5 is located between the shaft 10 and the portion of the drum 6 which is in contact with the load. The distance between the shaft 10 and the middle plane of the beams is approximately one-third of the radius of the drum 6.

Each beam 5 has two arms 51 and 52. The arms 51 are longer than the arms 52 (downstream arms), and carry the braking mechanism 8. The downstream arms 52 are connected to the upstream arms 51.

The shaft 10 is rigidly connected to the upstream arms 51 via bushings 11 and 12 making up the lateral bearings of the drum 6.

The bushing 11 includes the fixed section of the epicycloidal gear trains 9 as well as the satellite carrier of the first epicycloidal gear train.

These bushings 11 and 12 each contain a casing 13 enabling them to nest, without any clearance, into a pin 14 connected to the shaft 10. These pins 14 are perpendicular to the shaft 10 and accurately immobilize and connect the bushings 11 and 12 to one another.

The bushings 11 and 12 contain, at their ends, locking devices that lock with a respective supporting arm 51.

Each bushing 11, 12 has a hexagonal contour at its end that nests into a complementary contour present on each arm 51 as shown in FIG. 3. These contours simply and efficiently immobilize the bushings 11 and 12 with respect to the respective arm 51.

Preferably, these parts, with the exception of the central shaft, are made of a molded plastic material.

The arms 51 and 52 are separated by an articulation 15 which is a simple shrunk section of material and enables the arms 51 and 52 to move in relation to one another.

These arms 51 and 52, arranged on either side of the drum 6, define a dihedron having an intersecting angle passing through a respective articulation 15.

These arms have rods 16 and 17 at respective outer ends to ensure a link with the cradle 2.

These rods 16 and 17 are adapted to slide through the outer ends of the respective arms 51 and 52 in order to allow retraction of an end. Stops 18 and 19, in the form of flares for example, are provided. Between the stops 19 and the arms, springs 20 are provided which allow the rod ends to retract, in order to facilitate the assembly of the device in its cradle, especially shown in FIGS. 10 to 12.

The arms 51 and 52 each have respective gussets 21 and 22 lying below the middle plane. These gussets are arranged in a plane perpendicular to the axis of the shaft 10 of the speed limiter.

These gussets 21 and 22 include a stop 23 which limits the amplitude of the movement of the arms 51 and 52 about the articulation 15. A first element 24, in the form of a helicoid spring, medially urges the gussets 21 and 22 so that they touch one another at the level of the stop 23. The first spring 24 has a yield strength which is relatively low, in the order to 1 to 5 Newton/mm for instance. This spring 24 maintains the drum in a cantilevered position in a direct assembly as shown in FIG. 4. Further, the spring maintains contact pressure between the drum 6 and its driving vector (i.e., the load made up of a pallet or of a box in the case of a direct assembly or the intermediate cylinder(s) in the case of indirect assembly).

In a normal active position, the drum bears and is retracted by a load, and the arms 51 and 52 are generally parallel to one another. In a resting position, the arms 51 and 52 are slightly out of alignment and the articulation 15 is located above the plane passing through the axes of the rods 16 and 17.

This first spring 24 is arranged below the plane of the arms 51, 52, and also below the shaft 10. A second elastic element 25, also in the form of a helicoid spring, is hooked onto the ends of the gussets 21 and 22. This spring 25 is positioned proximate the external shell of the drum 36, below the first spring 24. The first spring 24 is intermediate the spring 25 and the shaft 10.

Both springs 24 and 25 are generally arranged symmetrically in relation to a vertical plane passing through the axis of the shaft 10. The gussets 21 and 22 enable such positioning of the springs 24 and 25. The gusset 21 includes a recess below the axis 10 of the drum 6, below the hub 26 of the arm 51.

The arm 51, which supports the hub 26 is longer than the arm 52. The articulation 15 is slightly offset in relation to the middle vertical plane which passes through the axis of the shaft 10, by a distance of approximately one-third of the radius of the drum 6.

The second elastic element 25 has a delayed action with respect to the first spring 24.

It is accommodated, at its ends, in respective orifices 27 having oblong shapes. These orifices 27 are tilted with respect to the axis of the second spring 25 and converge below the second spring 25. This second spring 25 is actuated (i.e., it is pulled) by the gussets 21 and 22, when the arms 51 and 52 are aligned and pivot about the articulation 15, moving articulation 15 below the plane passing through the axes of the rods 16 and 17.

This situation is caused by heavy braking of the drum 6, wherein the braking tends to make the arms 51, which are connected rigidly to the satellite-carrying bushing 11, turn in the same direction as the drum 6.

The spring 25 remains inactive when the drum 6 switches from the inactive position to the active position, wherein the drum is retracted by the load and maintained in contact with the load by the first spring 24.

These reactions are explained in detail diagrammatically in FIGS. 4 to 9.

FIG. 4 represents the assembly of a speed limiting device in a conveyor having cylinders 30 arranged as a slope on the structure 3, to form a tilted plane on which a pallet 31 moves with its load (not shown) by gravity from left to right when viewing FIGS. 4–9.

The speed limiting device is supported by a cradle 2 rigidly connected to the structure 3 of the facility.

Represented diagrammatically, the device has arms 51, 52, separated by the articulation 15. The gussets 21 and 22, i.e., under respective arms 51 and 52. These gussets have a respective stop 23 at their extreme lower section. The stops 23 are urged toward each other permanently by the first spring 24. The second spring 25 acts on the gussets when the arms 51 and 52 tilt with respect to one another, about the articulation 15, under the braking or locking effect of the drum 6 which tends to pivot the arms 51.

With respect to the first spring 24, the second spring 25 has a delayed action. It comes into play after retraction of the drum under the effect of the passing of a load having a speed such that it causes a heavy braking reaction from the limiting device.

The arm 52 is rigidly connected to the cradle 2 using the rod 17 which cooperates with an articulation 32 of the cradle. The rod 16 of the arm 51 bears upon a rest 33 of the cradle 2, to freely move and to enable the arm 51 to pivot about the articulation 15 which separates the articulation from the arm 52, when the drum 6 tends to urge the articulation into rotation.

As shown in FIGS. 4 to 6, the arms 51 and 52 are aligned generally in the same plane when the drum 6 of the speed limiting device is in normal position, being rotated by a driving vector (i.e., either a pallet 31 or the driving cylinders 30).

In the absence of pallets, the medial ends of arms 51 and 52 are tilted upwards, thereby positioning the articulation 15 above the planes of their rests as represented on FIG. 3. The angle of the dihedron formed by the arms is thus generally greater than 180° on the side of the contact area of the drum 6.

FIG. 5 represents an indirect assembly of the speed limiting device. This device is supported by a cradle 2, under a pair of cylinders 30. The drum 6 is centered intermediate two successive cylinders 30. Both cylinders are slightly cantilevered in relation to the plane of the other cylinders, in the absence of pallets. The cylinders 30 are generally mounted with a slight vertical clearance which then provides slight vertical offset of the cylinders in contact with the drum with respect to the other cylinders which, generally are freely rotatable.

The rods 16 and 17 of the speed limiting device are placed in the cradle 2, upon two rests 33 which are parallel to the surface of circulation of the loads. The speed limiting device is partially free in a plane parallel to that of the plane in which the pallets 31 move, so that they can be centered automatically in relation to both cylinders 30 with which the drum 6 is in contact.

The cradle is positioned to maintain the outer end of the arm 52 and the rod 17, a distance d from a wall 34 which creates a stop. This vertical wall 34 is part of the cradle 2 and is located at the end of the rest 33 that is located on the left of the figure. The distance d ranges from approximately three to ten millimeters.

When the drum 6 is strongly braked under the effect of speed, the drum is driven by a cylinder 30 located upstream. The drum 6 is also displaced, by adherence, from the cradle 2. The rods of the arms 51 and 52 slide over the rests 33, their displacement being limited by the wall 34. While moving under the upstream cylinder 30 in a direction opposite to that of the pallet 31, the arms 51 and 52 tilt the articulation 15. The articulation 15 is positioned below the plane passing through the ends of the arms 51 and 52. This pivoting action of the arms 51 and 52 causes the ends of the gussets 21 and 22 to draw away from one another. The pivoting also simultaneously causes traction on the elastic elements, which impairs the pivoting operation of the arms 51 and 52, and thus increases the pressure of the drum 6 onto the cylinder 30 which drives the drum 6.

This reaction is diagrammatically illustrated on FIGS. 7, 8 and 9.

FIG. 7 diagrammatically shows one of the ends of the second elastic element 25 in relation to the gussets 22. In inactive position (i.e., in the position corresponding to FIG. 3), the elastic element 25 is free with respect to its supporting gusset 22 and is also substantially free in relation to its gusset 21 (not represented).

FIG. 8 shows the second spring 25 in one of the configurations of FIGS. 4 to 6. In such a configuration, the arms 51 and 52 are in the same plane as the articulation 15. The first spring 24 acts on its own to maintain a pressure between the drum and its driving vector (i.e., the pallet 31 or the cylinders 30). The spring 25 is always inactive in such a configuration, but is ready for activation.

FIG. 9 represents the second spring 25 activated (i.e., pulled) by the gussets 21, 22 when further to the linear speed of the driving vector, the drum 6, strongly braked (if not locked completely) drives its supporting arm 51 into a pivoting movement which causes misalignment of both arms 51 and 52 about the articulation 15 and causes the gussets to draw apart.

The biasing force of the second spring 25 is greater than that of the first spring 24. This force can be 4 to 8 times that of the first spring 24, chosen according to the loads (e.g., 5 to 40 Newton/mm).

FIG. 6 shows another example of indirect assembly of the speed limiter. The drum 6 is in contact with a single cylinder 30. The rods 16 and 17 of the arms 51 and 52 have their outer ends bearing upon rests 33 of the cradle 2. This cradle 2 has a wall 35 which bears the ends of the rod 16 of the arm 51 to maintain contact and pressure between the drum 6 and its driving cylinder 30.

The speed limiter (and especially the arm 52) keeps translation potential in reverse direction of the movement of the pallet 31, in order to enable the actuation of the spring 25 when the drum is strongly braked. This implementation of the spring 25 increases the pressure between the drum 6 and the drum 30 and increases the adherence. The spring 25 allows control of adherence and limits it to a certain predetermined threshold, to avoid any damage to the speed limiting device and especially to the braking mechanism.

As shown in FIG. 5, it is shown in FIG. 6 that a distance d is present between the outer end of the arm 52 and the wall 34, to enable a limited translation of the device in the cradle 2. This distance d ranges from approximately three to 10 millimeters.

FIG. 11 shows a speed limiter positioned in a cradle 2. This cradle 2 has the form of a folded sheet metal strip to provide an open frame on one side of the device, and which is fitted with a cantilevered portion on the other side, enabling the device to be fastened offset on the structure of the installation.

This cradle 2 has orifices 36 allowing the passage of the rods 16 and 17 supporting the speed limiting device as shown in FIGS. 12 and 13.

These orifices or windows 36 have sizes vastly greater than the diameter of the rods 16 and 17, to allow the movement of the arms 51 and 52. This movement occurs when switching from the active position (in the case of direct assembly), to an active position in which the arms are aligned generally parallel to one another. The arms also move during switching from the active position to a high stress position, when the driving vector reaches or exceeds the linear speed threshold which causes the drum 6 to be locked. In such a high stress position, the arms 51 and 52 are misaligned under the effect of the locked drum 6.

Another cradle embodiment is shown in FIG. 3 and partially in FIG. 2. Provided are lateral angle brackets 37 fitted with orifices 38 open at their upper section to allow removal of the speed limiting device. These angle brackets 37 are placed on crossbeams 39 connected rigidly to the structure 3. Further, the length of the orifices 38 is greater than the diameter of the rods 16 and 17 to provide for rod movement.

FIG. 13 shows a section of the conveyor in a dynamic storage facility, having a plurality of cylinders 30 which forms a tilted plane over which the pallets 31 move by the effect of gravity.

In FIGS. 13 and 14, the speed limiter is not in direct contact with the cylinders 30. The drum 6 of the speed limiter is in contact with a pair of intermediate rollers or cylinders 40 which are arranged under the cylinders 30.

These rollers 40 are in contact with a common cylinder 30 and with other cylinders adjoining the common cylinder.

In a normal configuration, as shown in FIG. 13, the drum 6 is in contact with both intermediate rollers 40 with a pressure resulting from the action of the spring 24.

The rollers 40 perform a coupling function for the three cylinders 30 located above the speed limiter.

FIG. 14 shows the speed limiter in action in a braking operation, whereupon both springs 24 and 25 are activated.

In this configuration, the roller 40 in downstream contact with the drum 6 moves slightly vertically. Its rotational axis 41 is guided in rails 42 in the form of ports arranged sideways and oriented vertically.

The rollers 40 are made up of a material having a high adherence coefficient, of polyurethane type. These rollers 40 have a diameter which may be smaller than that of the cylinders 30.

FIGS. 13 and 14 also show an additional, intermediate roller or cylinder 43 located downstream of the rollers 40.

This roller 43 also serves as a coupling element between the cylinders located downstream of the drum 6.

The coupling system of several successive cylinders 30 enables increase of the braking effect of the pallet moving over the cylinders 30.

What is claimed is:

1. A speed limiter for boxes or pallets for use in an a conveyor system having a tilted plane, the limiter comprising:

a rotatable drum adapted to be pressed against a load, the load driving said rotatable drum;

a speed-sensitive braking mechanism adapted to hinder the rotational movement of said rotatable drum;

a shaft mounted coaxial to said drum, said drum and said braking mechanism being mounted about said shaft; and at least one bracket adapted to fixedly mount said shaft to a structure of the conveyor system, said bracket adapted to elastically press said drum to said load, said bracket having a predetermined degree of rotational movement such that said bracket may pivot about an axis transverse to the movement of the load, said at least one bracket comprising an elastic device providing a first level of force and a first resistance to movement of said bracket, said elastic device further providing a second level of force and a second resistance to movement of said bracket during braking of said drum, said second level of force adapted to increase the contact force between said drum and the load, said second resistance greater than said first resistance, and said at least one bracket applying said second level of force up to a predetermined threshold.

2. The speed limiter according to claim 1, wherein said drum is adapted to be pressed directly against the load.

3. The speed limiter according to claim 1, wherein:

a) said at least one bracket comprises a pair of brackets each laterally arranged on a respective end of said drum, each said bracket comprising an upstream arm and a downstream arm separated by an articulation, said upstream arm carrying said shaft and positioned between said articulation and a first portion of said bracket mounted to the structure, said downstream arm positioned between said articulation and a second portion of said bracket mounted to the structure, said upstream arm and said downstream arm forming a dihedron having an angle corresponding to said articulation, said upstream arm and said downstream arm each comprising:

a medial end and an outer end; and a respective gusset mounted in a plane perpendicular to said shaft, each said gusset having a stop configured such that, in a home position:
1) said stops maintain said upstream arm and said downstream arm in non-alignment with each other; and
2) said stops position said articulation above said outer ends of said arms;

b) the speed limiter further comprises a partial link between a said arm and a said portion of said bracket mounted to the structure, said partial link coordinating the movement of said arms;

c) said elastic device comprises;
a first elastic element mounted intermediate said gussets and having a biasing force such that said drum may be retracted upon the passage of the load thereover, and such that said drum is pressed against said load; and
a second elastic element mounted intermediate said gussets and having a biasing force higher then the biasing force of said first elastic element, said second elastic element adapted to act on said gussets such that said arms are substantially paralled to one another under braking of said drum.

4. The speed limiter according to claim 3, wherein each said gusset further comprises a channel adapted to accept an end of said second elastic element, and further adapted to maintain said second elastic element in an inactive state when said drum switches from an inactive position to an active position, wherein said drum is retracted by the load and maintained in contact by said first elastic element.

5. The speed limiter according to claim 3, wherein said first elastic element is a coil spring having a force constant ranging between approximately 1 and 5 N/mm.

6. The speed limiter according to claim 3, wherein said second elastic element is a coil spring having a force constant ranging between approximately 5 and 40 N/mm.

7. The speed limiter according to claim 3, wherein said shaft connects both upstream arms to each other.

8. The speed limiter according to claim 7, further comprising a rotation-locked assembly mounted to a respective upstream arm, wherein:

said drum comprises a bushing disposed at a respective end thereof, each said bushing having a recess therein and engaging a respective said rotation-locked assembly;

said shaft further comprises two pins engaging said recess of said bushing.

9. The speed limiter according to claim 3, further comprising:

a pair of transverse rods; and wherein each said arm has an opening at said outer end thereof adapted to accommodate an end of a said transverse rod, said arms and said rods defining a cradle about said drum, said openings having a diameter greater than that of said rods and providing movement of a said rod therethrough.

10. A speed limiter according to claims 9, wherein said cradle includes windows with a height that is greater than the diameter of the rods (16, 17) providing, the rod of the upstream arms (51) especially, a liberty of movement towards the load.

11. The speed limiter according to claim 9, wherein each said rod is adapted to be moved parallel to said shaft, each said rod comprising:

two stops each present proximate a respective said end of said rod; and a spring intermediate a said stop and a said arm.

12. The speed limiter according to claim 11, wherein said cradle comprises:

a folded sheet metal strip forming an open frame on one side of said drum;

a cantilever portion adapted to enable fastening of said frame to the structure of the conveyor system.

* * * * *